United States Patent

[11] 3,597,059

| [72] | Inventor | Herbert Gopfert<br>Dresden, Germany |
|---|---|---|
| [21] | Appl. No. | 759,625 |
| [22] | Filed | Sept. 13, 1968 |
| [45] | Patented | Aug. 3, 1971 |
| [73] | Assignee | VEB Pentacon Dresden Kamera-und<br>Kinowerke<br>Dresden, Germany |

[54] SLOW-MOTION CAMERA
3 Claims, 4 Drawing Figs.

[52] U.S. Cl. .................................................. 352/84,
352/119
[51] Int. Cl. .................................................. G03b 41/08
[50] Field of Search............................................ 352/84,
117, 119; 95/11

[56] References Cited
UNITED STATES PATENTS
3,259,448  7/1966  Whitley et al.................  352/84

Primary Examiner—Louis R. Prince
Assistant Examiner—Denis E. Corr
Attorney—Young and Thompson ABSTRACT: The slow-motion camera has a compensating prism rotatably mounted in a prism holder detachable from the camera housing. The prism is driven by a disengageable coupling from the film drive sprocket which moves in synchronism with the running of the film. When the coupling is disengaged a blocking pin secures the prism against rotation, with its parallel faces transversely of the optical axis.

3,597,059
Fig. 1.
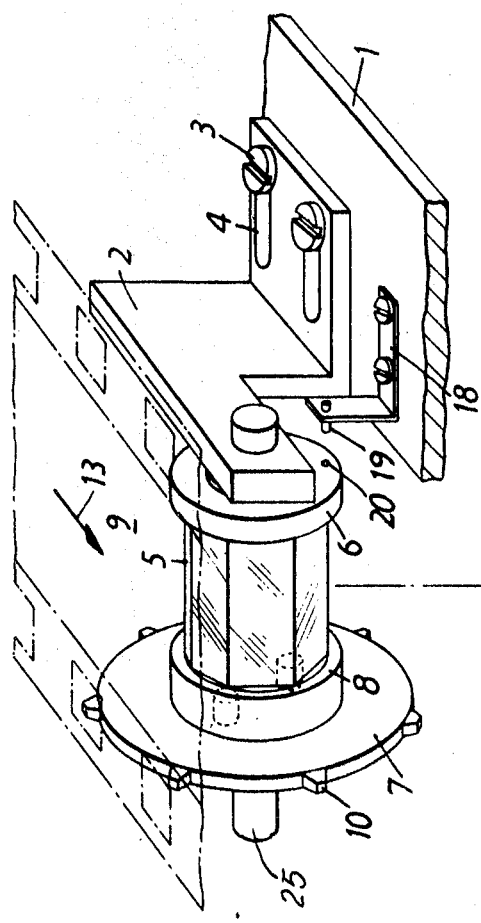
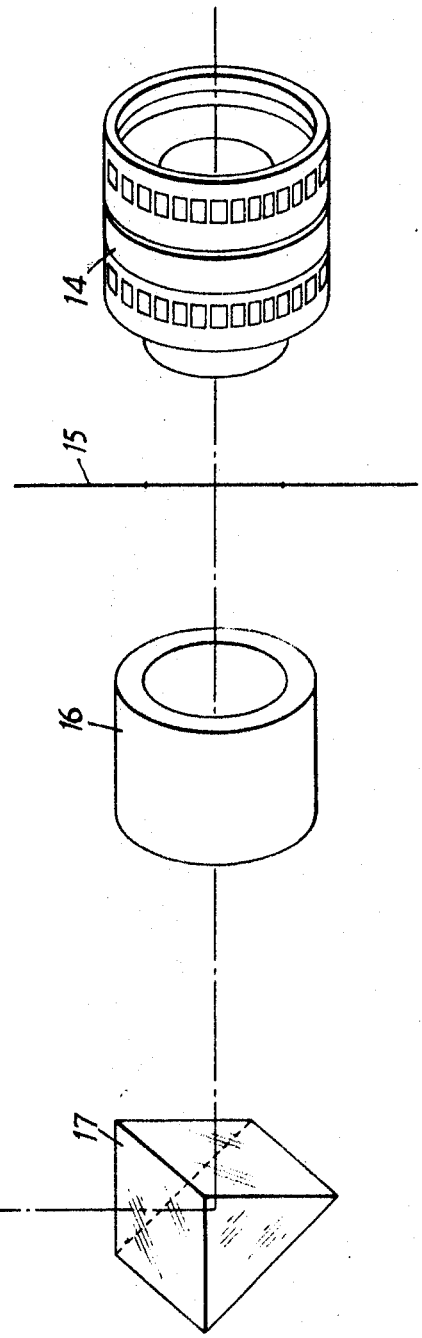
INVENTOR
HERBERT GÖPFERT
By Young & Thompson
ATTYS.

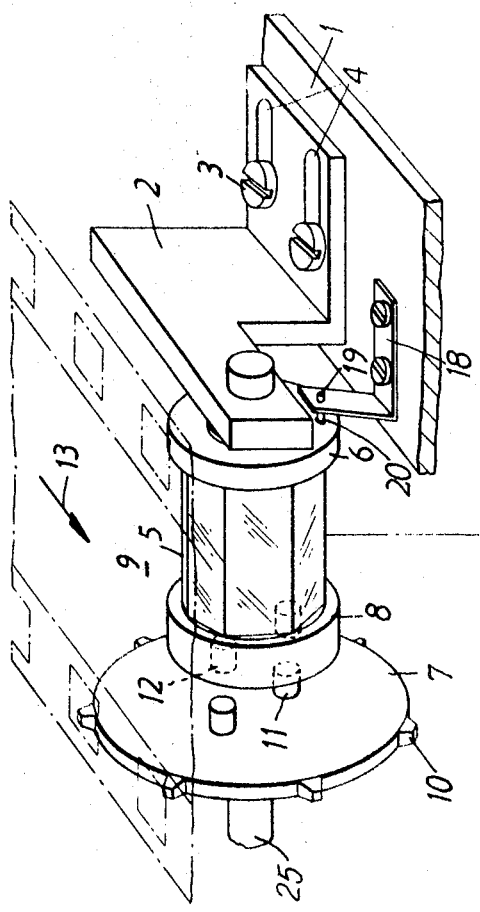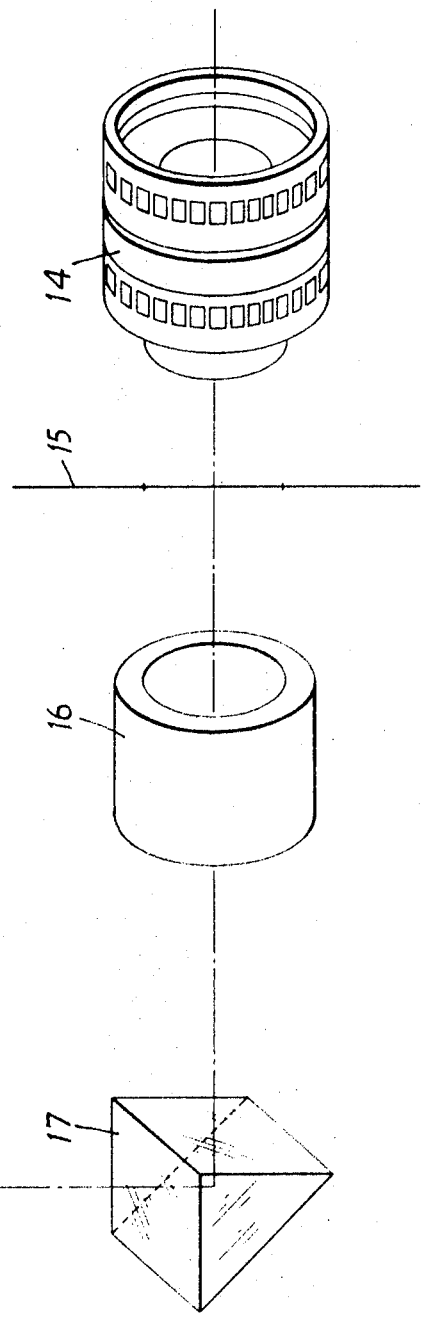

PATENTED AUG 3 1971 3,597,059
SHEET 3 OF 4
Fig.3.
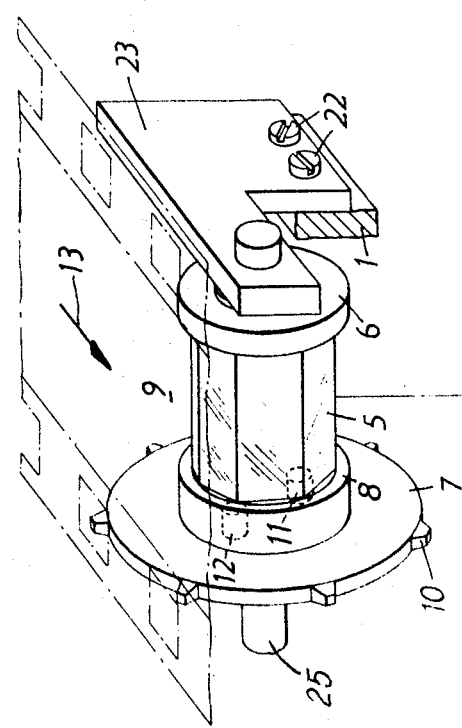
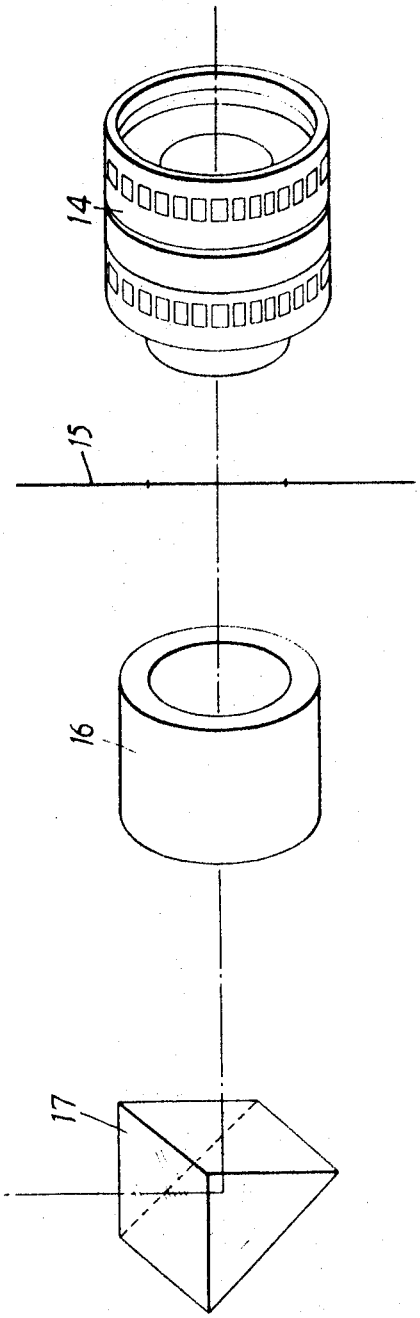
INVENTOR
HERBERT GÖPFERT
BY Young & Thompson
ATTYS.

PATENTED AUG 3 1971 3,597,059
SHEET 4 OF 4
Fig.4.
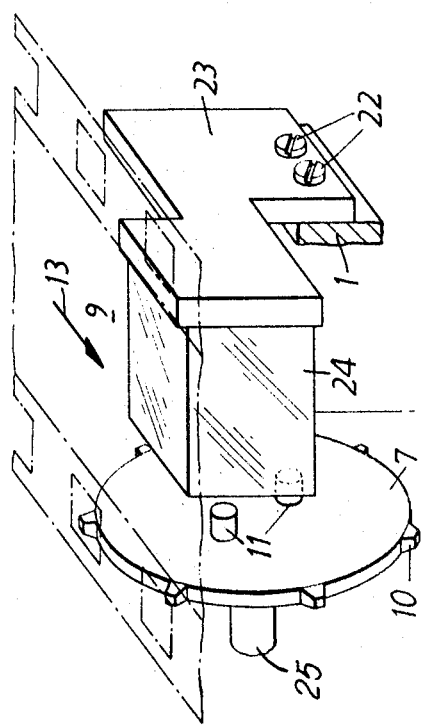
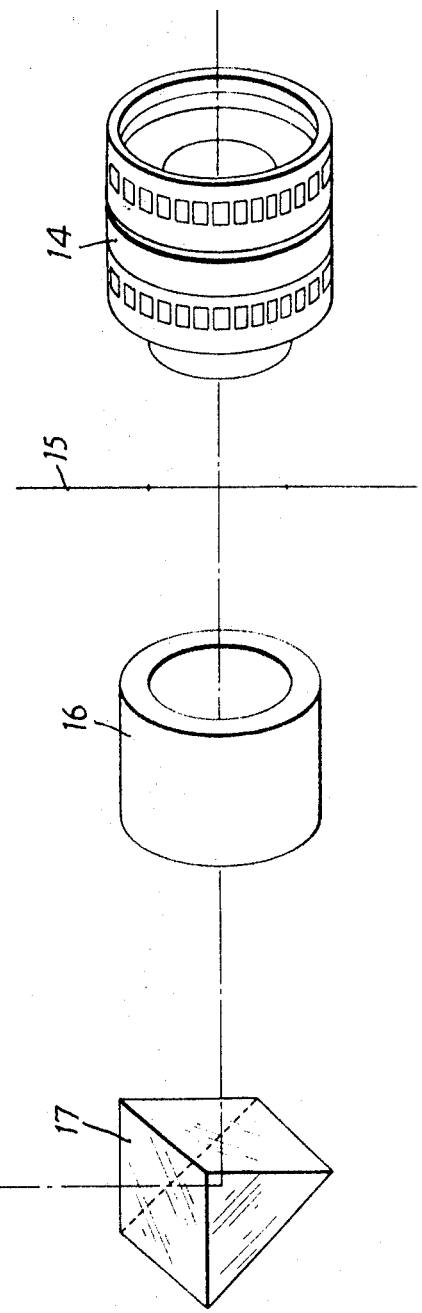
INVENTOR
HERBERT GÖPFERT
By Young & Thompson
ATTYS.

SLOW-MOTION CAMERA

BACKGROUND TO THE INVENTION

The invention relates to a slow-motion camera having a compensating prism which transmits the image of the photographed object to the film.

For the purpose of photographing very rapid movements, as for example for recording oscillograms, the film is conducted past a slit mask arranged in the image plane. It is known for this purpose to use slow-motion cameras without compensating prism and in this case to displace the mounting of the objective lens in the direction of the optical axis according to the varied picture distance. The conversion is complicated and inter alia the requisite adjustments delay bringing about readiness for picture-taking. In order to avoid lens displacement, in one known slow-motion camera the objective, lens is attachable according to choice to the eyepiece mounting of a reflex viewfinder, so that the photographic exposure takes place from the rear on to the film. In the case of this method either the light-sensitive coating of the film is reached only after penetration of the coating base, and therefore the photographed object is not sharply reproduced, or the film must be inserted, after prior respooling, with the coating side facing the viewfinder ray path.

The invention has the purpose of simplifying the reequipment of a slow-motion camera by solving the problem of being able to set the optical compensation out of action, according to choice, without variation of the reproduction distance.

SUMMARY OF THE INVENTION

According to the invention there is provided a slow-motion camera having an objective lens and film drive mechanism, in which there is provided film engaging and driving means driven by said mechanism, removable and replaceable compensating prism having a plurality of parallel pairs of diametrically opposed entry and exit surfaces and being rotatably disposed in the optical axis of the camera for transmitting the image to be filmed to the film, a holder arranged within the camera for supporting said prism, a disengageable coupling for effecting a driving connection between said prism and the drive means and blocking means arranged within said camera for blocking the prism against rotational movement and locating the latter with one pair of parallel surfaces at the normal to the optical axis when said coupling is in its disengaged state, said holder being movable to effect disengagement of said coupling and to facilitate removal of said prism if desired.

The invention will be explained by reference to examples of embodiment which are illustrated and described.

BRIEF DESCRIPTION OF DRAWINGS

FIG. 1 shows an axially slidably arranged compensating prism coupled with film drive;

FIG. 2 shows the compensating prism according to FIG. 1, uncoupled from the film drive;

FIG. 3 shows a replaceable compensating prism coupled with the film drive; and

FIG. 4 shows a replaceable intermediate prism for slit exposures.

DESCRIPTION OF PREFERRED EMBODIMENTS

A prism holder 2 is secured by means of screws 3 in a camera housing 1 (see FIG. 1) which is not particularly represented. The screws 3 extend through slots 4 of the prism holder 2, the slots 4 extending parallel with the axis of rotating of the compensating prism 5. The compensating prism 5 is supported in a bearing mounting 6 rotatably mounted in the prism holder 2, and in a coupling mounting 8 facing the drive sprocket 7, which mounting 8 engages with teeth 10 in the perforation of the film 9. The drive sprocket 7 possesses axial coupling bolts 11 (see FIG. 2), opposite to which corresponding coupling bores 12 are provided in the coupling mounting 8. The sprocket 7 is rotationally driven by a drive mechanism of which shaft 25 forms a portion. The film 9 is driven in the direction of the arrow 13. A blocking spring 18 fast with the housing carries a blocking bolt 19, which can engage in a blocking bore 20 of the bearing mounting 6.

The photographed object is reproduced by the picture-taking lens 14 in an intermediate plane 15, into which a slot mask can be insertable for the taking of slit (streak) pictures. The intermediate optical system 16 ensures the reproduction upon the film of the image produced in the intermediate plane 15. The mirror prism 17 serves for the deflection of the picture-taking ray path.

For the execution of slow-motion picture-taking using the rotating compensating prism 5 the prism holder 2 is secured in the position as shown in FIG. 1, by tightening of the screws 3. In this case the coupling bolts 11 of the drive sprocket 7 extend into the coupling bores 12 of the coupling mounting 8. The blocking pin 19 is out of engagement with the blocking bore 20 of the bearing mounting 6. On switching on of the film winding the compensating prism 5 is rotated in synchronism with the running of the film 9. If for example a slit (streak) exposure is to be effected, then a slot mask is pushed into the intermediate plane 15. After release of the screws 3 the prism holder 2 is pushed into the position as represented in FIG. 2 and secured there by tightening of the screws 3. By manual rotation of the compensating prism 5 the resilient blocking bolt 19 is brought into engagement with the blocking bore 20 of the bearing mounting 6. Since the connection between the coupling bolts 11 of the drive sprocket 7 and the coupling bores 12 of the coupling mounting 8 is disengaged, no rotation of the compensating prism 5 takes place on movement of the film.

In a further embodiment (FIG. 3), a compensating prism 5 is rotatably mounted in a prism holder 23 which is rigidly connectable with the camera housing 1. The prism holder 23 is replaceably connected with the camera housing 1 by screws 22. This prism holder 23 can be replaced by a prism holder 23 (see FIG. 4) in which there is located a rigid prism 24 of the same thickness across the opposed pairs of entry and exit surfaces as the compensating prism 5.

The measures as described and represented achieve the advantage that on dispensing with the optical compensation the distance between the objective lens 14 and the film plane can remain unchanged.

I claim:

1. In a slow-motion camera having an objective lens and film drive mechanism, the provision of film engaging the driving means driven by said mechanism, removable and replaceable compensating prism having a plurality of parallel pairs of diametrically opposed entry and exit surfaces and being rotatably disposed in the optical axis of the camera for transmitting the image to be filmed to the film, a holder arranged within the camera for supporting said prism, a disengageable coupling for effecting a driving connection between said prism and the drive means and blocking means arranged within said camera for blocking the prism against rotational movement and locating the latter with one pair of parallel surfaces at the normal to the optical axis when said coupling is in its disengaged state, said holder being movable to effect disengagement of said coupling and to facilitate removal of said prism if desired.

2. A slow-motion camera according to claim 1, wherein said film driving means is in the form of a sprocket and said disengageable coupling comprises coupling pins, extending from the sprocket parallel to its axis, engageable with bores provided in one end of the compensating prism, said prism holder being displaceable parallel with the axis of rotation of the prism, and said blocking means being in the form of a bolt engageable with a bore in the other end of the prism.

3. A slow-motion camera according to claim 2, wherein said bolt is resiliently mounted in the camera for movement substantially parallel to the rotational axis of the prism.